(12) United States Patent
Kuehnle et al.

(10) Patent No.: US 11,801,858 B1
(45) Date of Patent: Oct. 31, 2023

(54) SYSTEM AND METHOD FOR MONITORING CERVICAL MEASUREMENT OF A DRIVER AND MODIFYING VEHICLE FUNCTIONS BASED ON CHANGES IN THE CERVICAL MEASUREMENT OF THE DRIVER

(71) Applicant: Bendix Commercial Vehicle Systems LLC, Avon, OH (US)

(72) Inventors: Andreas U. Kuehnle, Strängnäs (SE); Todd T. Yoshikawa, Downey, CA (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 0 days.

(21) Appl. No.: 17/894,631

(22) Filed: Aug. 24, 2022

(51) Int. Cl.
| | |
|---|---|
| *B60W 50/14* | (2020.01) |
| *G06V 20/59* | (2022.01) |
| *G06V 40/16* | (2022.01) |
| *G06V 10/26* | (2022.01) |
| *B60W 40/08* | (2012.01) |
| *B60W 50/04* | (2006.01) |

(52) U.S. Cl.
CPC ............ *B60W 50/04* (2013.01); *B60W 40/08* (2013.01); *G06V 10/273* (2022.01); *G06V 20/597* (2022.01); *G06V 40/165* (2022.01); *G06V 40/171* (2022.01); *B60W 2040/0827* (2013.01); *B60W 2050/143* (2013.01); *B60W 2050/146* (2013.01); *B60W 2420/42* (2013.01); *B60W 2540/223* (2020.02); *B60W 2540/229* (2020.02); *G06T 2207/30268* (2013.01)

(58) Field of Classification Search
CPC ................. B60W 50/14; B60W 40/08; B60W 2040/0827; B60W 2050/143; B60W 2050/146; B60W 2420/42; B60W 2540/223; B60W 2540/229; G06V 10/273; G06V 20/597; G06V 40/165; G06V 40/171; G06T 2207/30268
See application file for complete search history.

(56) References Cited

U.S. PATENT DOCUMENTS

| | | | |
|---|---|---|---|
| 9,988,055 B1 | 6/2018 | O'Flaherty et al. | |
| 10,752,172 B2 * | 8/2020 | Daman | ................... B60R 1/00 |
| 11,485,265 B2 * | 11/2022 | Alequin | .................. B60N 2/56 |
| 2018/0319407 A1 * | 11/2018 | Lisseman | ............. B60W 50/14 |
| 2019/0283672 A1 * | 9/2019 | Daman | ................ B60W 50/14 |
| 2019/0318181 A1 * | 10/2019 | Katz | ...................... G06F 3/012 |
| 2021/0001810 A1 * | 1/2021 | Rivard | ................ G06V 40/172 |
| 2023/0001930 A1 * | 1/2023 | Moidunny | ........... B60W 50/14 |

* cited by examiner

*Primary Examiner* — Mohamed Barakat
(74) *Attorney, Agent, or Firm* — Crowell & Moring, L.L.P.

(57) ABSTRACT

System and methods that utilize driver facing cameras to monitor a neck size of a driver and to modify vehicle operations as an increase in neck size is detected are disclosed. In one form, a system includes a memory; an imaging device configured; and at least one processor in communication with the memory and the imaging device. The at least one processor is configured to receive an image of the interior of the vehicle captured by the imaging device; analyze the image and determine a parameter associated with a neck size of a driver of the vehicle that is present in the image; determine that the parameter associated with the neck size of the driver present in the image has increased more than a predetermined value; and modify an operation of the vehicle based on the parameter associated with the neck size of the driver present in the image increasing more than the predetermined value.

25 Claims, 6 Drawing Sheets

SYSTEM AND METHOD FOR MONITORING CERVICAL MEASUREMENT OF A DRIVER AND MODIFYING VEHICLE FUNCTIONS BASED ON CHANGES IN THE CERVICAL MEASUREMENT OF THE DRIVER

BACKGROUND

Commercial truck fleets regularly track a neck size of their drivers at their annual physical, as required by the Department of Transportation. An increase in a neck size of a driver correlates with an increased tendency to sleep apnea, which correlates to driver fatigue. As sleep apnea can often go undiagnosed, commercial truck fleets are examining ways to identify drivers who may be susceptible to sleep apnea and driver fatigue for further testing.

SUMMARY OF THE DISCLOSURE

The present disclosure describes implementations of system and methods that utilize driver facing imaging sensors, such as cameras, to monitor a neck size of a driver over a period of time, distance, or trips, and to modify vehicle operations as an increase is detected in the neck size of the driver to account for a potentially fatigued driver or less observant driver and to assist the driver with safe driving.

A system is disclosed that is configured to monitor a neck size of a driver and modify vehicle operations as an increase in neck size of the driver is detected. In one form, a system comprises a memory, an imaging device configured to capture an image of an interior of a vehicle, and at least one processor in communication with the memory and the imaging device.

The processor is configured to execute instructions stored in the memory and to receive the image of the interior of the vehicle captured by the imaging device; analyze the image and determine a parameter associated with a neck size of a driver of the vehicle that is present in the image; determine that the parameter associated with the neck size of the driver present in the image has increased more than a predetermined value and/or reached a threshold; and modify an operation of the vehicle based on the parameter associated with the neck size of the driver present in the image increasing more than the predetermined value.

Additionally, a method is disclosed for monitoring a neck size of a driver and modify vehicle operations as an increase in neck size of the driver is detected. In one form, a method includes a processor receiving an image of an interior of a vehicle that is captured by an imaging device and the processor analyzing the image and determining a parameter associated with a neck size of a driver of the vehicle that is present in the image. The method further includes the processor determining that the parameter associated with the neck size of the driver present in the image has increased more than a predetermined value and/or reached a threshold, and the processor modifying an operation of the vehicle based on the parameter associated with the neck size of the driver present in the image increasing more than the predetermined value.

Other objects, advantages and novel features of the present disclosure will become apparent from the following detailed description of one or more preferred embodiments when considered in conjunction with the accompanying drawings.

DETAILED DESCRIPTION OF THE DRAWINGS

Figure 1:
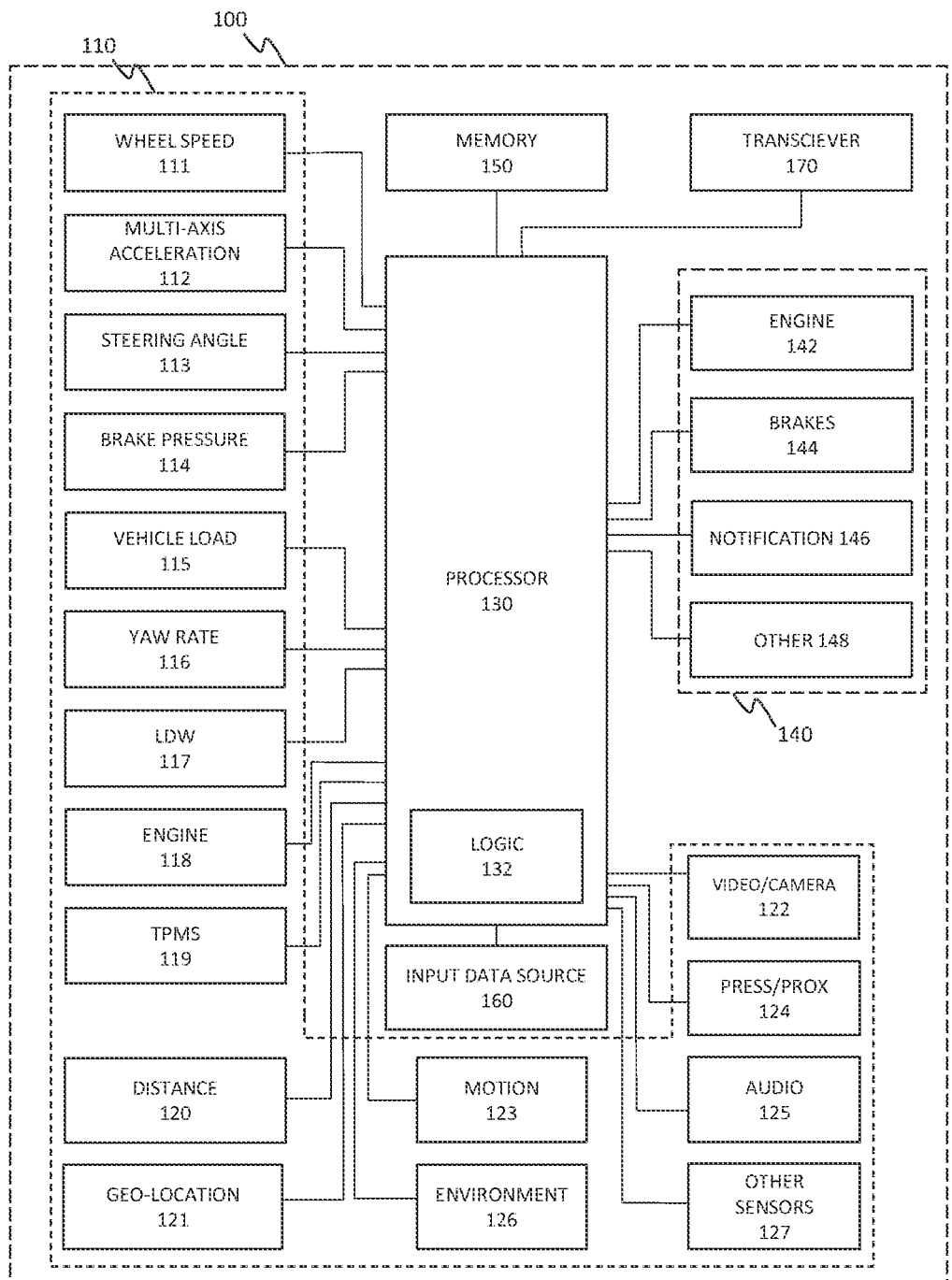
FIG. 1 is a schematic illustration of an exemplary system environment in which one form of a system may operate that is configured to monitor a neck size of a driver and to modify vehicle operations as an increase in a neck size of the driver is detected.

The present disclosure describes implementations of systems and methods that utilize driver facing imaging sensors, such as cameras, to monitor a neck size of a driver over a period of time, distance, and/or number of trips, and to modify vehicle operations as an increase is detected in the neck size of the driver to account for a potentially fatigued driver or less observant driver and to assist the driver with safe driving.

A driver neck size monitoring system may be configured to collect and provide data utilized in monitoring a neck size of a driver over a period of time, miles, trips, or any other unit of measurement. The data can include driver and/or vehicle related data collected from components of, or components interacting with, the driver neck size monitoring system. The components may include one or more driver facing imaging sensors, such as cameras, configured such that a field of view of the imaging sensor captures an image of a driver of the vehicle, as well as other areas of a vehicle cabin, such as the driver controls of the vehicle while driving and non-driver passenger areas. Other imaging sensors may be configured to capture other scenes relative to the vehicle, including but not limited to scenes in front of the vehicle, behind the vehicle, to either side of the vehicle, etc.

The components may further include vehicle devices, sensors and/or systems configured to provide non-video data, including non-video data corresponding to driver and/or vehicle related events. Such components may include one or more microphones, independent or in connection with the imaging sensors, configured to capture audio recordings of areas of the cabin and/or other vehicle areas (e.g., engine noise, etc.).

Examples of events that may be detected and/or collected by the driver neck size monitoring system include but are not limited to: safety events, for example and without limitation, excessive acceleration, excessive braking, exceeding speed limit, excessive curve speed, excessive lane departure, lane change without turn signal, loss of video tracking, LDW system warning, following distance (i.e., headway) alert, forward collision warning, collision mitigation braking, collision occurrence, etc., and non-safety events, for example and without limitation, the driver logging in/out of a vehicle telematics system, the driver/passenger entering/leaving the vehicle, the driver/passenger occupying/vacating the bunk area, the driver occupying/vacating the driver seat, the vehicle engine being on/off, the vehicle gear being in park/drive, the parking brake being on/off, etc.

The driver neck size monitoring system may use event data collected directly from vehicle devices, sensors, and/or systems, which may include data collected from an analysis of vehicle video, to generate datasets that correspond in time with one or more detected events. Data generated for a detected event may be associated with captured video frames whose timeline spans or overlaps the time when the event was detected/collected. Event data generated from an event determined from processing of captured vehicle video may at least be associated with the video from which it was generated, but may also be associated with other captured video frames whose timelines span or overlap the time when the event was detected/collected (in these scenarios, the time may be calculated based on the video frame or frames from which the event object was derived).

The driver neck size monitoring system may be further configured to collect and provide performance-based data corresponding to detected performance indicators characterizing driving performance. The performance-based data can include vehicle and/or driver related data collected from components of, or components interacting with, the event driver neck size monitoring system, including but not limited to vehicle devices, sensors and/or systems. The driver neck size monitoring system may also use the performance-based data to detect performance events, as a particular type of driver and/or vehicle related event, and to generate associated datasets that correspond in time with one or more detected events.

Accordingly, the components, individually and collectively, may be configured to detect, in real time, the performance indicators (and/or performance events), and/or to report such performance indicators (and/or performance events) to the driver neck size monitoring system. Examples of performance indicators include but are not limited to: following distance (i.e., headway), driving smoothness, driver hand positioning (e.g., gestures), driver head position and facing direction, fatigue metrics, vigilance and reaction time measurements, etc., and any other indicator tending to characterize driving performance—particularly with respect to potentially impaired and/or enhanced driving performance due to, for example, distraction, inattention, increased focus, co-piloting, or other behavior.

One or more records of the detected events and/or the data sets generated in association therewith may be stored as corresponding to individual drivers and/or driving teams detected during the driving excursion, a period thereof, or otherwise during a timespan associated with the driving excursion (e.g., recently prior or subsequent to the driving excursion). As used herein, a "driving team" refers to one or more individuals, each of whom at any time during the driving excursion may be the driver or the passenger, but for which there is at least one driver at any given time.

The detection of drivers and/or driving teams may be via vehicle telematics log-in, facial and/or person recognition, or any other mechanism or process—which may identify the detected driver as associated with identification data (e.g., a personal ID number, etc.). Accordingly, events may be detected, recorded and reported as associated with the appropriate driver(s) and/or driving team(s) based at least partially on the personal identification data.

The event driver neck size monitoring system may further be configured to control one or more vehicle systems in response to detected events. Examples of such control include but are not limited to: providing one or more types of warnings (e.g., driver assistance system warnings, warnings to passengers in the cabin that the driver requires assistance, etc.), intervening in the operation of the vehicle (e.g., to initiate corrective action, to activate harm mitigating features, to assume partial or complete autonomous control, etc.), setting driver/passenger authorizations for the driving excursion (e.g., via vehicle telematics, etc.), and alerting remote locations/devices (e.g., backend servers, dispatch center computers, mobile devices, etc.) of such events. A variety of corrective actions may be possible and multiple corrective actions may be initiated at the same time.

FIG. 1 is a schematic block diagram illustrating details of one form of a driver neck size monitoring system 100. The driver neck size monitoring system 100 is configured to capture and analyze images of a driver of a vehicle as well as to detect a variety of operational parameters and conditions of the vehicle and the driver's interaction therewith (i.e., event-based data, performance-based data, etc.). As discussed in more detail below, when the driver neck size monitoring system determines an increase in a neck size of a driver that is above a predetermined value, the system may modify one or more operations of the vehicle to account for a potentially fatigued driver or less observant driver and to assist the driver with safe driving.

The driver neck size monitoring system may store data related to the analysis of the image of the driver as well as data related to detected events (i.e., event-based data or data sets) and/or the system may transmit the data to a remote location/device (e.g., backend server, dispatch center computer, mobile device, etc.).

The driver neck size monitoring system 100 may include one or more devices or systems 110 for providing vehicle and/or driver related data, including data indicative of one or more operating parameters or one or more conditions of a commercial vehicle, its surroundings and/or its cabin occupants. The driver neck size monitoring system 100 may, alternatively or additionally, include a signal interface for receiving signals from the one or more devices or systems 114, which may be configured separate from system 100. For example, the devices 110 may be one or more sensors, such as but not limited to, one or more wheel speed sensors 111, one or more acceleration sensors such as multi-axis acceleration sensors 112, a steering angle sensor 113, a brake pressure sensor 114, one or more vehicle load sensors 115, a yaw rate sensor 116, a lane departure warning (LDW) sensor or system 117, one or more engine speed or condition sensors 118, and a tire pressure (TPMS) monitoring system 119. The driver neck size monitoring system 100 may also utilize additional devices or sensors, including for example a forward distance sensor and/or a rear distance sensor 120 (e.g., radar, lidar, etc.) and/or a geo-location sensor 121. Additional sensors for capturing driver related data may include one or more imaging devices 122, such as cameras or video sensors, and/or motion sensors 123, pressure or proximity sensors 124 located in one or more seats and/or driver controls (e.g., steering wheel, pedals, etc.), audio sensors 125, or other sensors configured to capture driver related data. The driver neck size monitoring system 100 may also utilize environmental sensors 126 for detecting circumstances related to the environment of the driving excursion, including for example, weather, road conditions, time of day, traffic conditions, etc. Other sensors 127, actuators and/or devices or combinations thereof may be used or otherwise provided as well, and one or more devices or sensors may be combined into a single unit as may be necessary and/or desired. For example, biometric sensors may be included for detecting biometric data of the vehicle occupants.

The driver neck size monitoring system 100 may also include a logic applying arrangement such as a controller or processor 130 and control logic 132, in communication with the one or more devices or systems. The processor 130 may include one or more inputs for receiving data from the devices or systems. The processor 130 may be adapted to process the data and compare the raw or processed data to one or more stored threshold values or desired averages or value ranges, or to process the data and compare the raw or processed data to one or more circumstance-dependent desired values, so as to detect one or more driver and/or vehicle related events.

The processor 130 may also include one or more outputs for delivering a control signal to one or more vehicle control systems 140 based on a determined increase in a neck of a driver of the vehicle, detection of other events, and/or in response to vehicle and/or driver related data. The control signal may instruct the systems 140 to provide one or more types of driver assistance warnings (e.g., warnings relating to braking, obstacle avoidance, driver performance, passenger performance, etc.) and/or to intervene in the operation of the vehicle to initiate corrective action. For example, the processor 130 may generate and send the control signal to an engine electronic control unit 142 or an actuating device to reduce the engine throttle and slow the vehicle down. Further, the processor 130 may send the control signal to one or more vehicle brake systems 144 to selectively engage the brakes (e.g., a differential braking operation), or to maintain a larger headway. A variety of corrective actions may be possible and multiple corrective actions may be initiated at the same time.

The vehicle control components may further include brake light(s) and other notification devices 146, which may be configured to provide warnings and/or notifications externally to the vehicle surroundings and/or internally to the vehicle occupants. Example warnings and/or notifications include: headway time/safe following distance warnings, lane departure warnings, warnings relating to braking and or obstacle avoidance events, warnings related to driver performance, warnings related to passenger performance, and any other type of warning or notification in furtherance of the embodiments described herein. Other vehicle control systems 148 may also be controlled in response to detected events and/or event data.

The driver neck size monitoring system 100 may also include a memory portion 150 for storing and accessing system information, such as for example the system control logic 132. The memory portion 150, however, may be separate from the processor 130. The sensors 110, controls 140 and/or processor 130 may be part of a preexisting system or use components of a preexisting system.

The driver neck size monitoring system 100 may also include a source of vehicle-related input data 160, which may be indicative of a configuration/condition of the commercial vehicle and/or its environmental circumstances (e.g., road conditions, geographic area conditions, etc.). The processor 130 may sense or estimate the configuration/condition and/or environmental circumstances of the vehicle based on the input data, and may select a control tuning mode or sensitivity based on the vehicle configuration/condition and/or environmental circumstances. The processor 130 may compare the operational data received from the sensors 110 to the information provided by the tuning. Such tuning may be useful, for example, where a distracting passenger is present while driving a heavily loaded vehicle. Such input data may be further useful in evaluating driving performance, as described herein. For example, the driving performance of one or more driving team may be evaluated with respect to common environmental circumstances (e.g., performance in less desirable geographic areas).

In addition, the driver neck size monitoring system 100 is operatively coupled with one or more driver facing imaging devices, shown for simplicity and ease of illustration as a single driver facing camera 122 that is trained on the driver and/or trained on the interior of the cab of the commercial vehicle. However, it should be appreciated that one or more physical video cameras may be disposed on the vehicle such as, for example, a video camera on each corner of the vehicle, one or more cameras mounted remotely and in operative communication with the driver neck size monitoring system 100 such as a forward-facing camera to record images of the roadway ahead of the vehicle. Such cameras may, for instance, indicate undesirable proximity to objects, the roadway verge, etc.

In some implementations, driver related data is collected directly using the driver facing camera 122, such driver related data including head position, eye gaze, hand position, postural attitude and location, or the like, within the vehicle. In addition, driver identity and/or presence can be determined based on facial recognition technology, body/posture template matching, and/or any other technology or methodology for making such determinations by analyzing video data.

In operation, the driver facing camera 122 generates video data of the captured image area. The video data may be captured on a continuous basis, or in response to a detected event. Such data may comprise a sequence of video frames with separate but associated sensor data that has been collected from one or more on-vehicle sensors or devices, as detailed herein.

The driver neck size monitoring system 100 may also include a transmitter/receiver (transceiver) module 170 such as, for example, a radio frequency (RF) transmitter including one or more antennas for wireless communication of data and control signals, including control requests, event-based data, performance-based data, vehicle configuration/condition data, or the like, between the vehicle and one or more remote locations/devices, such as, for example, backend servers, dispatch center computers, and mobile devices, having a corresponding receiver and antenna. The transmitter/receiver (transceiver) module 170 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 130 may be operative to select and combine signals from the sensor systems into driver related data and/or event-based data and/or performance-based data representative of higher-level vehicle data. For example, data from the multi-axis acceleration sensors 112 may be combined with the data from the steering angle sensor 113 to determine excessive curve speed event data. Other hybrid data relatable to the vehicle and/or driver and obtainable from combining one or more selected raw data items from the sensors includes, for example and without limitation, excessive braking event data, excessive curve speed event data, lane departure warning event data, excessive lane departure event data, lane change without turn signal event data, lane change without mirror usage data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, following distance event data, fuel consumption event data, ACC usage event data, and late speed adaptation (such as that given by signage or exiting). Still other hybrid data relatable to the vehicle and/or driver and obtainable from combining one or more selected raw data items from the sensors includes, for example and without limitation, driver out of position event data, passenger out of position event data, driver distracted event data, driver drowsy event data, driver hand(s) not on wheel event data, passenger detected event data, wrong driver event data, seatbelt not fastened event data, driver cellphone use event data, distracting passenger event data, mirror non-use event data, unsatisfactory equipment use event data, driver smoking event data, passenger smoking event data, insufficient event response event data, insufficient forward attention event data. The aforementioned events are illustrative of the wide range of events that can be monitored for and detected by the driver neck size monitoring system 100, and should not be understood as limiting in any way.

The driver neck size monitoring system 100 may further include a bus or other communication mechanism for communicating information, coupled with the processor 130 for processing information. The system may also include a main memory 150, such as random access memory (RAM) or other dynamic storage device for storing instructions and/or loaded portions of a trained neural network to be executed by the processor 130, as well as a read only memory (ROM) or other static storage device for storing other static information and instructions for the processor 130. Other storage devices may also suitably be provided for storing information and instructions as necessary or desired.

In some implementations, the driver neck size monitoring system 100 of FIG. 1 is configured to execute one or more software systems or modules that perform or otherwise cause the performance of one or more features and aspects described herein. Computer executable instructions may therefore be read into the main memory 150 from another computer-readable medium, such as another storage device, or via the transceiver 170. Execution of the instructions contained in main memory 150 may cause the processor 130 to perform one or more of the process steps described herein. In some implementations, hard-wired circuitry may be used in place of or in combination with software instructions to implement the disclosure. Thus, implementations of the example embodiments are not limited to any specific combination of hardware circuitry and software.

Methods for monitoring a neck size of a driver of a vehicle and modifying an operation of the vehicle based on changes in the neck size of the driver, such as those described below, may be performed within the environment described above in conjunction with FIG. 1.

Figure 2:
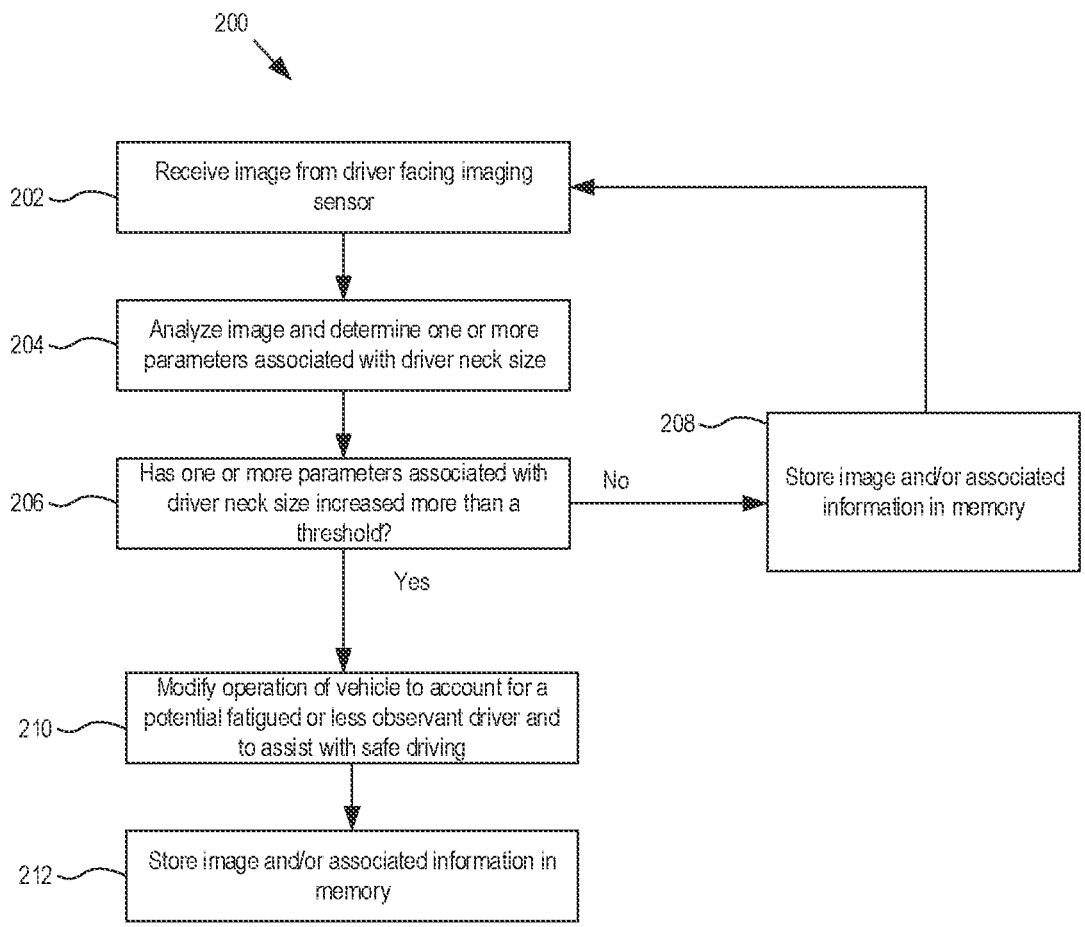
FIG. 2 is a flow chart of one form of a method for monitoring a neck size of a driver of a vehicle and modifying one or more operation of the vehicle based on changes in the neck size of the driver.

FIG. 2 is a flow chart of one form of a method for monitoring a neck size of a driver of a vehicle and modifying an operation of the vehicle based on changes in the neck size of the driver.

At step 202, a processor of a system of a vehicle, such as those described above in conjunction with FIG. 1, receive an image of an interior of a vehicle that is captured by an imaging device. In some implementations, the imaging device may be a driver-facing camera. However, in other implementations, the imaging device may be any other type of imaging device or sensor capable of generating data that may be utilized to take a cervical measurement of a neck of a driver.

Figure 3:
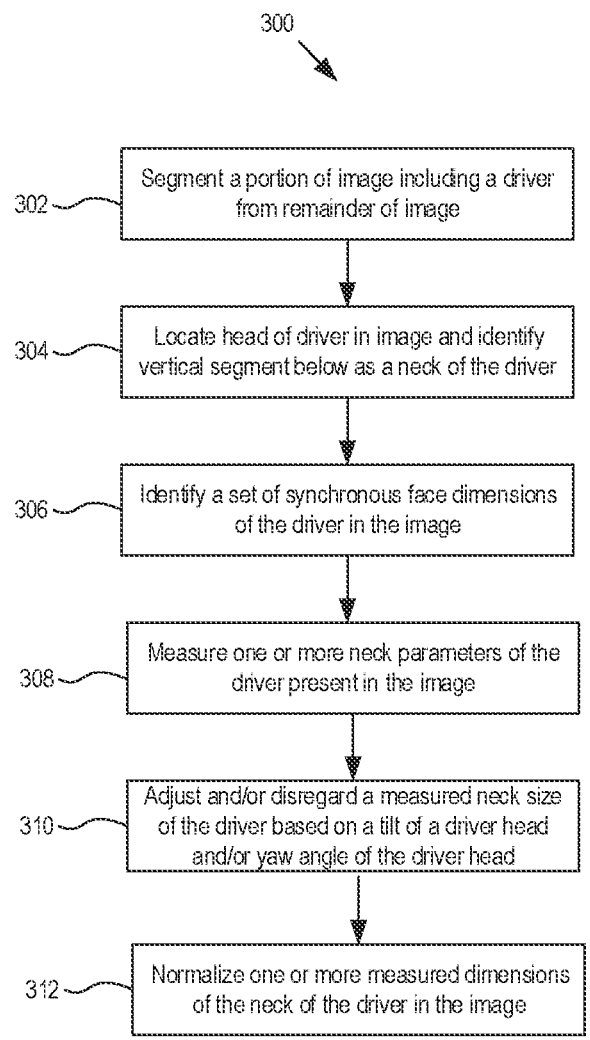
FIG. 3 is a flow chart of one method to analyze an image of an interior of a vehicle and determine one or more parameters associated with a neck size of a driver of the vehicle that is present in the image.

At step 204, the processor analyzes the image of the interior of the vehicle and determines one or more parameters associated with a neck size of a driver of the vehicle that is present in the image, as described in more detail in conjunction with FIG. 3.

FIG. 3 is a flow chart of one method to analyze an image of an interior of a vehicle and determine one or more parameters associated with a neck size of a driver of the vehicle that is present in the image.

At step 302, the processor segments a portion of an image including the driver of the vehicle from a remainder of the interior of the vehicle. In some implementations, the processor will have analyzed one or more images of the interior of the vehicle to learn a color of a seat and/or a seat pattern of the seat where a driver of the vehicle sits while operating a vehicle. Accordingly, when the processor then analyzes a new image of the interior of the vehicle that includes the driver of the vehicle, the processor utilizes a difference between a hue and intensity or texture of the learned color and seat pattern of the seat where the driver sits and a hue and intensity or texture of the driver to isolate the portion of the image including the driver and segment the image of the driver from the remainder of the image. In some implementations, the processor may additionally or alternatively utilize models of human facial appearance and characteristic constellations of landmark facial features such as the eyes, mouth, etc. to assist in identifying a driver in an image and to isolate the portion of the image including the driver and segment the image of the driver from the remainder of the image.

At step 304, the processor locates a head of the driver present in the image and identifies a vertical body segment below the head as a neck. In some implementations, the processor may utilize a similarity in skin tone between a head of the diver and the vertical body segment below the head to identify the neck of the driver.

At step 306, the processor identifies a set of synchronous face dimensions of a driver present in image. In some implementations, the processor may identify one or more of an interocular distance between the eyes of the driver in the image, a segmented arc length along a check contour of the driver in the image, or a concavity direction percentage of a cheek line of the driver in the image.

Figure 4:
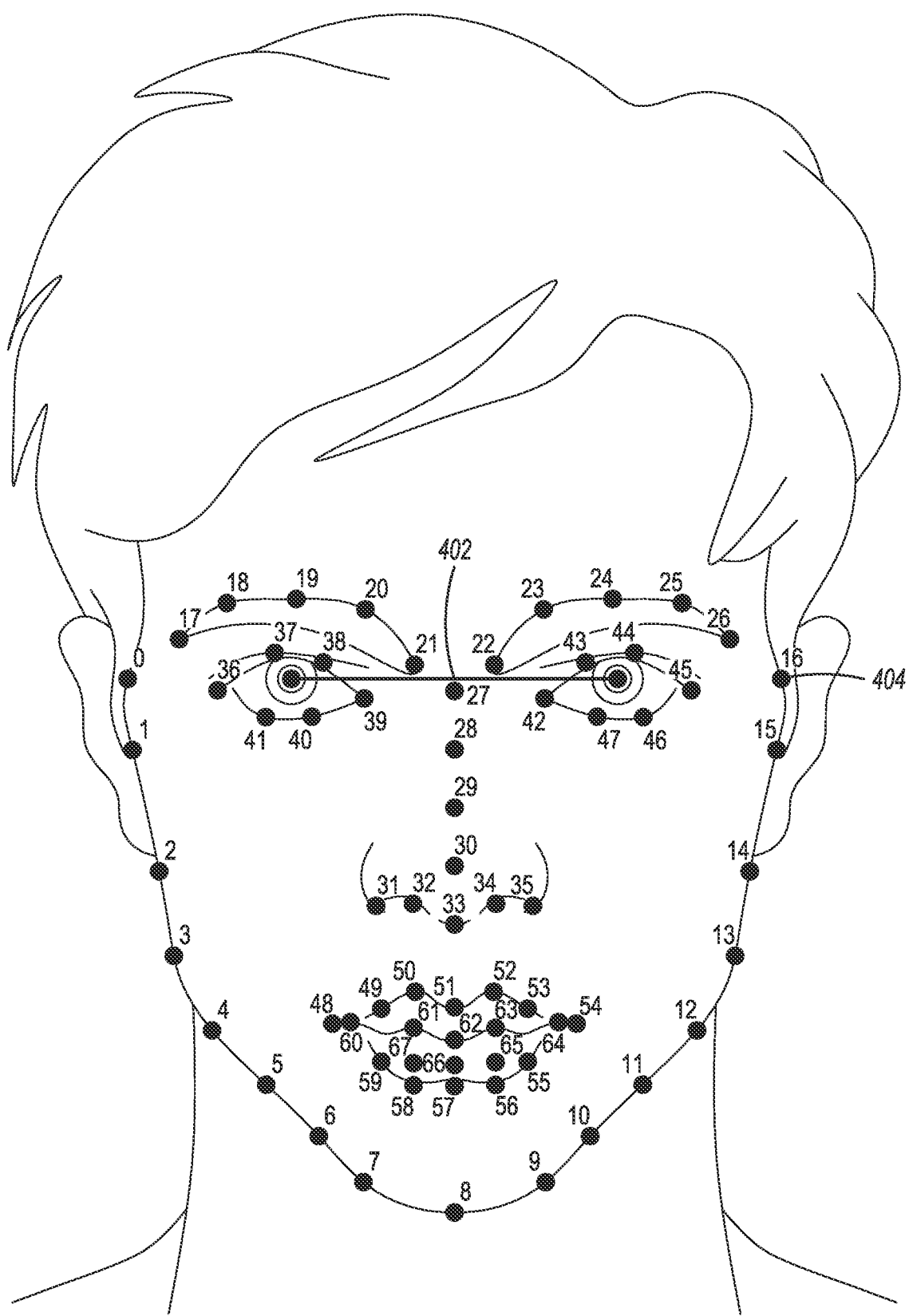
FIG. 4 is an illustration of an image of a face of a driver and associated data points for measurement of synchronous face dimensions.

Referring to the illustrative example shown in FIG. 4, a processor may measure an interocular distance 402 by measuring between data points on each of the driver's eyes. Additionally, the processor may measure a segmented arc length along a cheek contour of a driver by measuring along the check contour 404 as defined by data points 0 to 16.

In some implementations, the processor may also measure points 17-26 that define the eye brows of the driver, point 27-35 that define a nose of the driver, points 36-47 that define an outline of the eyes of the driver and/or points 48-67 that define the mount and lips of the driver. One of skill in the art will appreciate that the processor may identify and generate data points 0-67 when analyzing an image of a driver through the use of generic face models, such as those taught by the Viola-Jones face detection algorithm, and/or by using Haar cascade techniques. Generally, the processor may locate an end of facial features as those points where moving left, right, up, and/or down one pixel leads to a decrease in the Haar features. Haar features are computer vision models for various combinations of light and dark pixels that respond with a high value when, for example, a vertical edge is present. Using this technique the processor detects likely candidates for parts of the face utilizing properties such as eye regions of the face tend to be darker than cheek regions, and a nose region of the face has more bright pixels than the eye region.

After measuring the segmented arc length along the cheek contour, the processor may normalize the segmented arc length along the cheek contour 404 by the interocular distance 402. One of skill in the art will appreciate that an interocular distance between the eyes of a driver will stays constant as other facial features of the driver change as the face of the driver becomes fuller or more slender as the driver gains or loses weight. Accordingly, once an interocular distance for a driver is established, an interocular distance as measured in an image can be used to normalize other measured facial characterization in the same image.

For example, if an interocular distance is established to be X, but the interocular distance is measured to be 10% larger than X in an image, the processor will determine that other measured features such as a measured segmented arc length along the cheek contour will be approximately 10% larger as well. Accordingly, the measured values of the interocular distance and the segmented arc length along the cheek contour are each reduced by 10% before utilizing these values in a determination of whether a neck size of the driver has increased.

In some implementations, an initial interocular distance may be established when a doctor measures the interocular distance of the driver during their annual physical, as required for commercial drivers by the Department of Transpiration. In other implementations, the processor may set the initial interocular distance after examination of a plurality of images of the face of the driver.

The processor may additionally measure a concavity direction 406 percentage of the cheek line 408 in the image. One of skill in the art will appreciated that a concavity direction percentage of a cheek line regularly reflects a person's weight. That is, when a cheek line is fuller with a rounded outward cheek line, the concavity direction percentage serves as a secondary indicator of an increased weight of a driver.

For example, in some implementations, when the processor determines an increase in a neck size of a driver as discussed in more detail below, the processor may utilize measurements such as the concavity direction percentage of the driver as a secondary indicator to confirm an increase in weight of the driver.

In yet further implementations, the processor may utilize measurements such as the concavity direction percentage of the driver as a secondary indicator to trigger the processor to perform additional functions such as taking a higher resolution image of a driver's face for processing. For example, the driver-facing camera may generally take a normal resolution picture of the driver, but when a secondary indicator of increases weight such a concavity direction of a cheek line reflects a driver with increased weight, the processor may utilize the driver-facing camera to take a higher resolution image and/or an uncompressed image of the interior of the vehicle with the driver.

Another example of a secondary indicator that the processor may utilize to confirm an increase in the weight of the driver and/or to trigger additional operations is for the processor to examine the image of the driver and determine whether discoloration or distexturation is present in the skin of the driver. Generally, discoloration or distexturation may be an alteration from normal skin tone or the presence of lines where in earlier images there were none or fewer, below the eyes. Such discoloration or distexturation typically appears as "bags" under the eyes of the driver.

Figure 5:
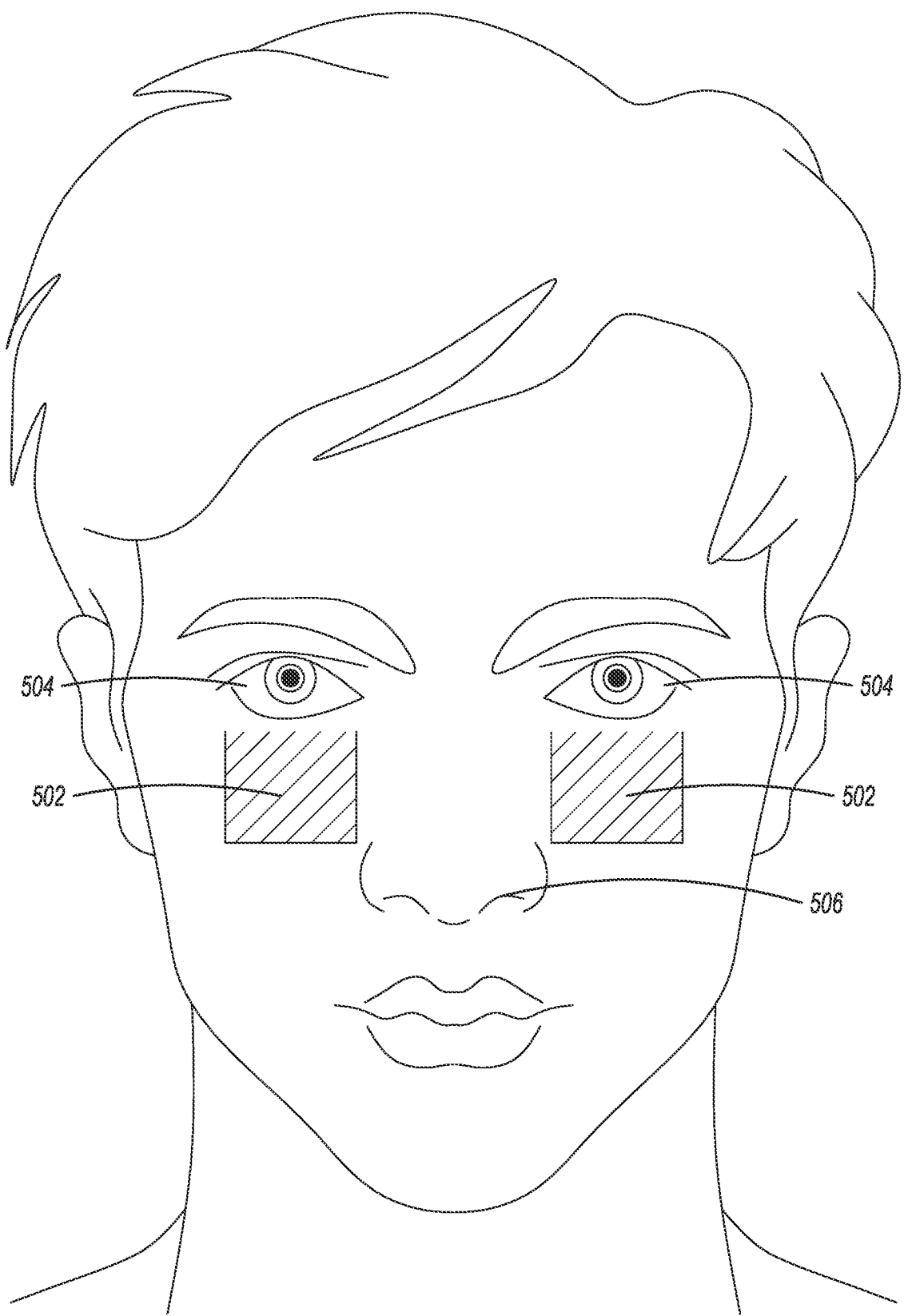
FIG. 5 is an illustration of an image of a face of a driver and associated data points for determining whether discoloration or distexturation is present in the skin of the driver

FIG. 5 is an illustrative face of a driver that the processor analyzes to determine whether discoloration or distexturation is present in the skin of the driver. When analyzing the face 500, the processor may analyze areas 502 below the driver's eyes 504 and compare a skin hue in areas 502 to a skin hue in other areas of the head of the driver. In some implementations the area 502 that the processor analyzes is defined by a width of a driver's eye 504 and a point of a noise 506 of the driver.

Referring again to FIG. 3, at step 308, the processor measures one or more neck parameters of the driver present in the image. In some implementations, referring to FIG. 6, the processor may only measure a lower limit neck dimension 602 of the neck of the driver. However, in other implementations, the processor may utilize other points at the neck to measure a neck size of the driver. The processor may utilize a horizontally-oriented segmentation operation to identify the lower limit of the neck dimension of the driver.

The processor may measure a neck of the driver in terms of a neck circumference, a neck width, as a ratio of other known values such as an interocular distance, or any other means that provide the ability to determine whether a size of a neck is increasing in images captured over a period of time, a period of vehicle trips, or a distance traveled, for example.

In some implementations, rather than only measuring the lower neck dimension of the driver, the processor may measure a dimension of the neck of the driver at multiple locations along the neck at step 308. In the illustrative example of FIG. 6, the processor measures a dimension of the neck at locations 602, 604, and 606 that generally correspond to 220%, 200%, and 180% of an interocular distance 608 down from a nose tip 614 of the driver.

Figure 6:
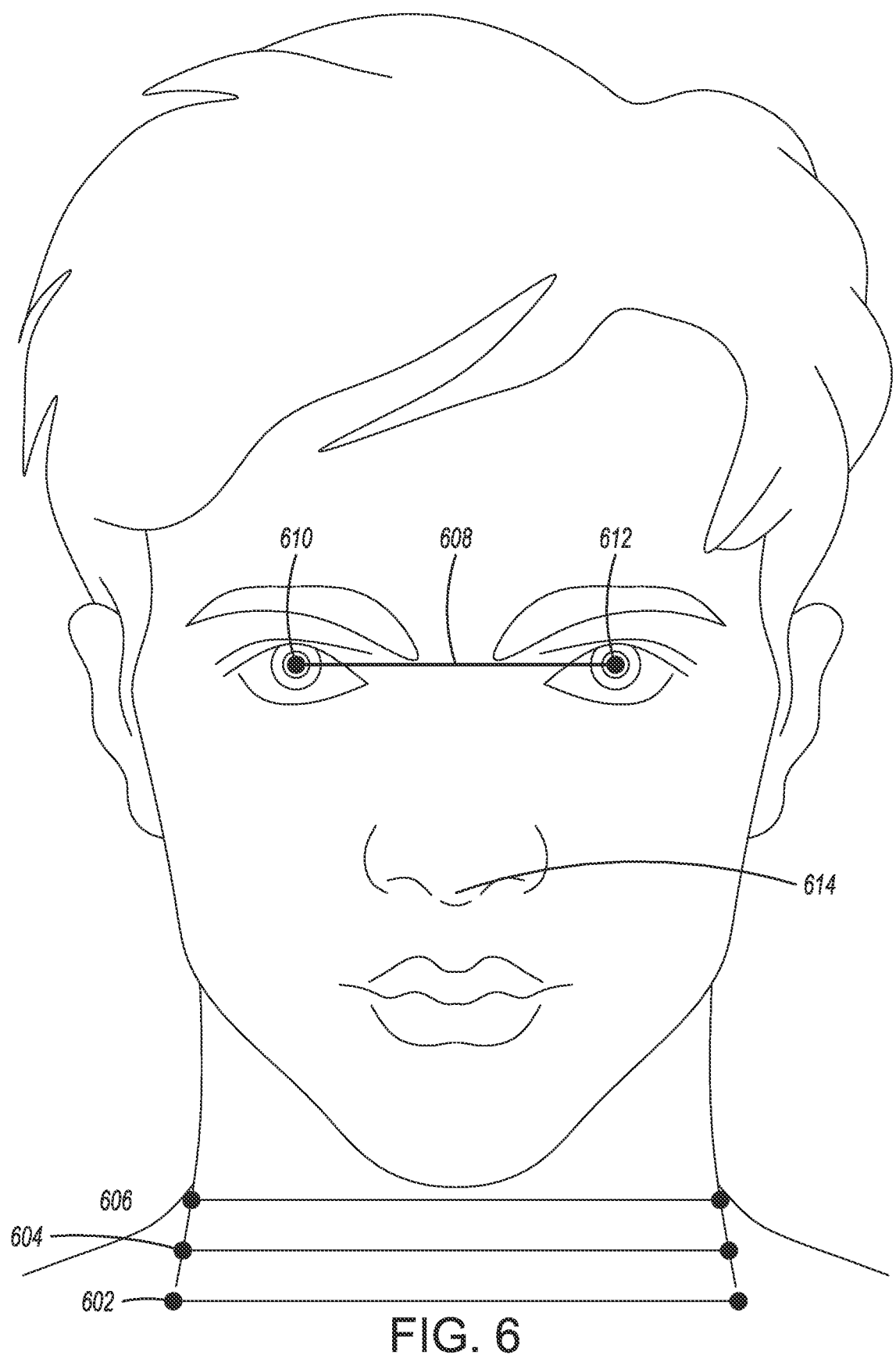
FIG. 6 is an illustration of an image of a face and neck of a driver for measurement of one or more neck dimensions.

In the illustrative example of FIG. 6, the processor determines that an interocular distance 608 between a first eye 610 and a second eye 612 of the driver in the image is equal to approximately 504 pixels. Based on the determine interocular distance, the processor measures a dimension of the neck at locations 602, 604, and 606 according the Table 1.

TABLE 1

| | Interocular Distance % | Location Down From Nose Tip | Measurement | Ratio |
|---|---|---|---|---|
| 602 | 220% | ~1,109 pixels | 763 pixels | ~1.514 |
| 604 | 200% | 1,016 pixels | 778 pixels | ~1.544 |
| 606 | 180% | ~908 pixels | 782 pixels | ~1.552 |

For example, the processor measures location 602 at approximately 1,109 pixels down from the nose tip 614 of the driver (504 pixels*220%=approx. 1,109 pixels). The processor measures a size the neck of driver at location 602 to be 763 pixels, where a ratio of the measured width of the neck of driver to the interocular distance is approximately 1.514 (763 pixels/504 pixels=approx. 1.514).

The processor measures location 604 at 1,016 pixels down from the nose tip 614 of the driver (504 pixels*200%=1,016 pixels). The processor measures a width the neck of driver at location 604 to be 778 pixels, where a ratio of the measured width of the neck of driver to the interocular distance is approximately 1.544 (778 pixels/504 pixels=approx. 1.544).

The processor measures location 606 at approximately 908 pixels down from the nose tip 614 of the driver (504 pixels*180%=approx. 908 pixels). The processor measures a width the neck of driver at location 606 to be 782 pixels, where a ratio of the measured width of the neck of driver to the interocular distance is approximately 1.552 (782 pixels/504 pixels=approx. 1.552).

One of skill in the art will appreciate that the determined ratios may be used to indirectly determine whether a neck size of a driver has reached a critical size. For example, a driver may have their neck size initially measured and then at substantially the same time, have their picture taken. The neck size of the driver is initially measured to have a 16 inch circumference, and in the picture of the driver, the width of the neck of the driver is measured to be 48 pixels wide and an interocular distance of the driver is measured to be 24 pixels. When a future picture is taken and the driver is positioned at a different distance from a camera, the width of the neck of the driver is measured to be 25.5 pixels and the interocular distance of the driver is measured to be 12 pixels. Using the relationships between these values, a current circumference could be determined using the values (25.5/12)/(48/12)*16 inches=17 inches. In other words, the relative dimensions of neck and interocular distance in the two dimensions (the ratios) in terms of pixels and how they relate to driver deck size can be used to calculate a neck size of a driver in different pictures.

When identifying one or more of an interocular distance between the eyes of the driver in the image, a segmented arc length along a check contour of the driver in the image, or a concavity direction percentage of a cheek line of the driver in the image, the processor may utilize a yaw angle of a face of the driver in the image in the calculations.

In some implementations, a yaw angle of a face of the driver is an angle between a direction of the imaging sensor, such as a camera, that captures an image of the interior of the vehicle that includes the driver and direction that a driver is facing. In this implementation, a yaw angle when a driver is directly facing the imaging sensor would be zero. However, one of skill in the art will appreciate that other yaw angles could be utilized such as an angle between a direction that a driver is facing and a direction straight out a windshield of a vehicle.

At step 310 the processor may adjust a measured size of the neck of the driver or determine whether to disregard a measured size of the neck of the driver based on a tilt of a head of the driver in the image and/or a yaw angle of a head of the driver in the image.

A neck size of a driver in an image may vary with head tilt forward or backwards from level, or with looking away from an imaging sensor (yaw angle). When a head tilt from level is too large or a yaw angle of the head of a driver in an image is too large, the processor may modify the measured size of the neck of the driver based on the amount of tilt or degree of yaw angle, or even determine to disregard the measured size of the neck of the driver all together.

In some implementations, the processor may disregard a measured size of a neck of a driver when a head tilt of the driver in the image is outside of a range +/−10 degrees of level. Similarly, in some implementations, the processor may disregard a measured size of a neck of a driver when a yaw angle of the head of the driver is so large that a value such as an interocular distance between the eyes of the driver cannot be measured, resulting in an inability to normalize the measured size of the neck of the driver.

In yet further implementations, the processor may disregard a measured size of a neck of a driver when a head tilt of the driver in the image is outside of the range +/−10 degrees of level and a degree of yaw angle of the driver in the image looking away from the imaging sensor is outside of +/10 degrees. One of skill in the art will appreciate that while the example of +/−10 degrees is provided as an illustrative example, any value may be used to bound the head tilt or yaw angle of a head of a driver in an image that indicates a measured size of a neck of the driver in the image may be relied upon.

In some implementations, rather than disregard a measured neck size, the processor adjusts a measured neck size based on an amount that the driver is looking away from the imaging sensor when an image is captured. The processor may adjust a measured neck size according to the formula:

$$\frac{\text{Measured Neck Size(pixels)}}{(\text{cosine (head pose yaw angle)})} * \text{Measured Interocular Distance (pixels)}$$

For example, continuing with the illustrative example above, when a driver is facing away from the imaging sensor by a 20 degrees yaw angle, the processor modifies the measured size at location 606 to be approximately 1.652 pixels according to the equation:

$$\frac{782 \text{ pixels}}{\text{cosine (20 degrees)}} * 504 \text{ pixels} = \text{approx } 1.652 \text{ pixels}$$

At step 312, the processor compares the one or more measured dimensions of the neck measured to the set of synchronous face dimensions to normalize the one or more measured dimensions of the neck of the driver present in the image.

In some implementations, the processor normalizes the measured dimensions of the neck by comparing measured neck dimensions and measured synchronous face dimensions to known fixed values of facial features of a driver. For example, a synchronous face dimension of an interocular distance of a person does not change. Accordingly, if a processor determines that a measured interocular distance is 10% larger than a known interocular distance, the processor will reduce the measured interocular distance and the measured neck size by 10% each to ensure that consistent neck size values are compared when determining whether a neck size of the driver has increased.

In some implementations, the processor may calculate a normalized dimension of the neck based on a ratio of the determined dimension of the neck to at least one facial dimension of the set of synchronous face dimensions such as the interocular distance. For example, a driver may have an initial neck size measured to be 16 inches in circumference and an associated picture taken of the driver is determined to show 48 pixels in a neck width of the driver and an interocular distance of the driver as 24 pixels. In a later image, a processor may determine that a driver has a neck with of approximately 50 pixels and also have an interocular distance of approximately 24 pixels. Accordingly, the processor may determine a circumference of the neck of the driver to be (50/48)*16 inches in circumference=16.67 inches in circumference.

Referring again to FIG. 2, after analyzing the image and determining one or more parameters associated with a neck size of a driver of the vehicle that is present in the image as described above, at step 206 the processor determines whether the parameter associated with the neck size of the driver present in the image has increased more than a predetermined threshold value.

In some implementations, the predetermined threshold value may be set based on information for a driver that is obtained during their annual physical. A driver will normally have their picture taken as part of their annual physical and will have facial dimensions such as their neck size measured. The processor may utilize the driver information from their physical for calibration purposes and to determine a baseline value with which to compare future neck width measurement and the predetermined value at which operation of a vehicle should be changed. In one illustrative example, the predetermined threshold value may be set for a driver at 17 inches neck size circumference based on an initial measured neck size circumference of 16 inches and 17 inches representing a 6.24% increase in neck size. The predetermined threshold value may be set as a percent increase from a baseline value, an increased amount from the baseline value, or any other way of expressing a threshold increase from one value to another value at which it becomes desirable to provide warning to a driver regarding their performance and/or modify an operation of a vehicle.

Rather than utilizing driver information obtained at their annual physical, the processor may alternatively set a predetermined threshold value based on an analysis of an initial set of images of the driver to determine an interocular distance of the driver and a baseline value of a neck size of the driver. In one illustrative example, the processor may analyze an initial set of images of the driver and determine, after compensation for factors such as head yaw angle, the that driver has an interocular distance of 62 mm and a neck size width approximately equal to 200% of the interocular distance, a unitless value. Accordingly, the processor may initially determine that the driver has a neck size width of 62 mm*200%=124 mm, corresponding to a neck diameter 4.88 inches and a neck size circumference of approximately 15.3 inches. The processor may then set a threshold for the driver at 230% of the driver interocular distance which generally equates to a neck size circumference for the driver of 17 inches, generally corresponding to a critical neck size as identified by the Department of Transportation.

In some implementations, in setting the predetermined threshold value, the processor may additionally utilize performance information associated with vehicle. For example, the processor may relate driving performance—e.g. the frequency of performance events or indications of fatigue as detected by the vehicle systems—to neck size. If there is sufficient correlation over multiple trips, the processor may extrapolate to identify a neck size which would produce an unacceptable or unsafe event rates or fatigue for a driver. The processor may utilize this identified neck size to set the predetermined threshold value at which it become desirable to provide warning to a driver regarding their performance and/or modify an operation of a vehicle.

In one illustrative example, based on driver information recorded by a physician at their annual physical and/or analyzing one or more images of a driver taken at their annual physical, it may be established that a neck size (in terms of neck circumference or neck width) of a driver at a narrowest portion of their neck is 150% of the interocular distance of the driver at the time of the physical. If this equates to a neck circumference of 18 inches for the driver (12 inch interocular distance*150%=18 inch circumference), each time a new image of the driver is analyzed, the processor may determine if the measured neck size of the driver has increased to a threshold such as 19.8 inches of circumference or 165% of the driver interocular distance (12 inch interocular distance*1.65=19.8 inch circumference).

In some implementations, the predetermined threshold value may be associated with other parameters such that the predetermined threshold is an amount of percentage increase in a neck size of the driver over at least one of a period of time, a number of trips of the vehicle, or a mileage driven by the driver.

When the processor determines at step 206 that the parameter associated with the neck size of the driver present in the image has not increased more than the predetermined threshold value, at step 208 the processor may store in a memory at least one of the image or information associated with the image for future use and the method loops to step 202 where the above-described process is repeated for a new image. In some implementations, the processor may store information associated with the image such as the measured interocular distance of the driver and the measured neck size of the driver.

When the processor alternatively determines at step 206 that the parameter associated with the neck size of the driver present in the image has increased more than the predetermined threshold value, at step 210, the processor modifies an operation of the vehicle to account for a potentially fatigued driver or less observant driver and to assist the driver with safe driving, and at step 212, the processor may store in a memory at least one of the image or information associated with the image for future use.

In some implementations the processor may adjust operations of the vehicle by adjusting warning margins and assistance levels provided to the driver during operation of the vehicle. For example, the processor may display or emit an alert to the driver recommending that the driver take breaks for frequently. The processors may display an alert on a vehicle display and/or a mobile device of the driver, and may emit an alert from a vehicle audio system and/or the mobile device of the driver. In some of these implementations, the in-vehicle system may recognize the presence of the mobile device of the driver, for example, from its Bluetooth emanations, and push a pairing request to it. The mobile device of the driver and an audio generation chip in the in-vehicle system might then be used to deliver audible messages rather than visual ones. A similar mechanism may be applied to a Bluetooth-equipped radio in the vehicle.

Similarly, with respect to driver assistance systems of the vehicle, the processor may increase at least one of an amount of time before a braking action that vehicle systems alert the driver to an upcoming braking action or the processor may increase a distance before initiation of a braking action that vehicle systems alert a driver to an upcoming braking action. Further, the processor may perform operations such as adjusting a content of information of information that vehicle system provides to the user; a type of information that vehicle system provides to the user; an intensity of information that vehicle systems provide to the user; or a frequency with which vehicle system provides information to the user.

With respect to operations of the vehicle, the processor may also perform operations such as adjusting a braking performance of the vehicle or adjusting a stability performance of the vehicle. Because the driver may be more tired than usual due to lower sleep quality, braking performance may be adjusted to begin earlier or more positively. Braking may be set to start once the driver has removed their foot from the gas pedal and an object is detected ahead at close range. That is, braking is anticipated and started earlier than in normal operation with a usual 'driver must actively start to brake' scenario. In some circumstances, the processor may further perform actions such as engaging autonomous control of the vehicle, or once stopped in a safe location, prohibiting the driver from further operating the vehicle.

In implementations described above, one or more parameters associated with a neck size of a driver are obtained from an analysis of an image and compared to a predetermined threshold value. In other implementations, at step 204 described above, the processor may utilize averages of parameters associated with the neck of the driver over a plurality of images of the driver generated at different times that may occur over a period of time, a number of trips of the vehicle, or a mileage driver by the driver, for example. One of skill in the art will appreciate that utilizing a plurality of measurement at different points on a neck of the driver and averaging values measured across a plurality of images of the driver increase measurement reliability.

Continuing with the illustrative example described above in connection with FIG. 6 and Table 1, at step 304 the processor measures a dimension of a neck of a driver at locations 602, 604, and 606 along the neck of the driver across multiple images, and then average the results.

TABLE 2

| Percentage down | Image 1 (Time 1) | Image 2 (Time 2) | Image 3 (Time 3) | Average |
|---|---|---|---|---|
| 220% (location 602) | 150% | 160% | — | 155% |
| 200% (location 604) | 140% | 150% | 160% | 150% |
| 180% (location 606) | 120% | 130% | 140% | 130% |

Table 2 illustrates measurements at three different locations on a neck of a driver across three different images. The three different locations where the processor determines a size of a neck in an image are defined as 220%, 200% and 180% of an interocular distance down from a nose tip of the driver, where the measurements of the neck size are also in percentage of an interocular distance of the driver.

As shown in Table 2, the measured values for a position on the neck of the driver from the three different images are averaged. For example, at location 606 which is 180% of the interocular distance down from a nose of the driver, the values across all three images (120%, 130%, and 140%) are averaged to obtain an average value of 130% for location 606. This averaged value for location 606 may then be compared to the predetermined threshold value to determine when to modify an operation of the vehicle to account for a potentially fatigued driver or less observant driver and assist the driver with safe driving.

It should be noted that in Table 2, in the row for location 602 that is 220% of the interocular distance down from a nose of the driver has a reduced number of values. This may occur when the neck size of the driver cannot be measured at this location of the neck because, for example, the driver may be wearing clothing that obstructs this location of the neck in an image.

One of skill in the art will appreciate that the processor may aggregate the averages at various neck heights with various operations such as an average, maximum, or weighted average. A maximum operation provides a largest sensitivity in determining an increase in neck size where an averaging operation provides a lower sensitivity, but with more confidence due to the combination of multiple measurements.

FIGS. 1-6 and their accompanying descriptions describe implementations of systems and methods of the present disclosure that utilize driver facing imaging sensors, such as cameras, to monitor a neck size of a driver over a period of time, distance, and/or number of trips, and to modify vehicle operations as an increase is detected in the neck size of the driver to account for a potentially fatigued driver or less observant driver and to assist the driver with safe driving. Those having ordinary skill in the art may be able to make alterations and modifications to what is described herein without departing from its spirit and scope. The present disclosure is to be considered as an exemplification of the principles of the present disclosure, and is not intended to limit the broad aspects of the present disclosure to any embodiment or implementations described herein.

In accordance with the practices of persons skilled in the art, aspects of embodiments and implementations of the present disclosure may be described with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, code segments perform certain tasks described herein. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the detailed description and corresponding figures, numerous specific details are set forth in order to provide a thorough understanding of the present disclosure. However, it should be appreciated that the disclosure may be practiced without such specific details. Additionally, well-known methods, procedures, components, and circuits have not been described in detail.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner on one or more embodiments without limitation.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like.

In addition, and further in accordance with the descriptions herein, the term "logic," as used herein, particularly with respect to FIG. 1, includes hardware, firmware, software in execution on a machine, and/or combinations of each to perform a function(s) or an action(s), and/or to cause a function or action from another logic, method, and/or system. Logic may include a software-controlled microprocessor, a discrete logic (e.g., ASIC), an analog circuit, a digital circuit, a programmed logic device, a memory device containing instructions, and so on. Logic may include one or more gates, combinations of gates, or other circuit components.

The embodiments and implementations described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

The invention claimed is:

1. A system, comprising:
    a memory;
    an imaging device configured to capture an image of an interior of a vehicle; and
    at least one processor in communication with the memory and the imaging device, the at least one processor configured to execute instructions stored in the memory and to:
        receive the image of the interior of the vehicle captured by the imaging device;
        analyze the image and determine a parameter associated with a neck size of a driver of the vehicle that is present in the image;
        determine that the parameter associated with the neck size of the driver present in the image has increased more than a predetermined value; and
        modify an operation of the vehicle based on the parameter associated with the neck size of the driver present in the image increasing more than the predetermined value.

2. The system of claim 1, wherein to analyze the image and determine the parameter associated with the neck size of the driver of the vehicle that is present in the image, the processor is configured to:
    determine a set of synchronous face dimensions of the driver present in the image;
    identify a neck of the driver of the vehicle present in the image;
    determine a dimension of the neck of the driver present in the image; and
    compare the dimension of the neck to the set of synchronous face dimensions to determine a normalized dimension of the neck as the parameter associated with the neck size of the driver present in the image.

3. The system of claim 2, wherein to identify the neck of the driver of the vehicle present in the image, the processor is further configured to:
    segment the image to remove at least one of a seat color or a seat pattern from the image; and
    identify the neck as a central, vertical body segment below a head of the driver present in the image.

4. The system of claim 2, wherein the set of synchronous face dimensions comprises at least one of:
- a segmented arc length along a cheek contour of the driver;
- an interocular distance between the eyes of the driver; or
- a concavity direction percentage of a cheek line of the driver.

5. The system of claim 2, wherein the normalized dimension of the neck is based on a ratio of the determined dimension of the neck to at least one facial dimension of the set of synchronous face dimensions.

6. The system of claim 2, wherein to determine that the parameter associated with the neck size of the driver present in the image has increased more than a predetermined value, the processor is configured to:
- determine that an amount of an increase in the parameter or a percentage increase in the parameter associated with the neck size of the driver present in the image exceeds a threshold.

7. The system of claim 6, wherein the amount of the increase in the parameter or the percentage increase in the parameter is determined over at least one of a period of time, a number of trips of the vehicle, or a mileage driven by the driver.

8. The system of claim 1, wherein to modify the operation of the vehicle, the processor is configured to:
- adjust at least one of a warning margin or an assistance level for the driver when the parameter associated with the neck size of the driver present in the image has increased more than the predetermined value.

9. The system of claim 8, wherein to adjust the warning margin for the driver, the processor is configured to:
- increase at least one of an amount of time before a braking action, or a distance before initiation of the braking action, that the driver is alerted to the braking action.

10. The system of claim 9, wherein the amount of time before the braking action, or the distance before initiation of the braking action, that the driver is alerted to the braking action is based on an amount of increase of the parameter associated with the neck of the driver present in the image.

11. The system of claim 8, wherein to adjust the assistance level, the processor is configured to:
- display or emit an alert to the driver recommending that the driver take breaks more frequently.

12. The system of claim 8, wherein to adjust the assistance level, the processor is configured to adjust at least one of:
- braking performance of the vehicle;
- stability performance of the vehicle;
- a content of information of information that the system provides to the driver;
- a type of information that the system provides to the driver;
- an intensity of information that the system provides to the driver; or
- a frequency with which the system provides information to the driver.

13. The system of claim 1, wherein the imaging device is a driver facing camera.

14. A method, comprising:
- receiving, with a processor, an image of an interior of a vehicle that is captured by an imaging device;
- analyzing, with the processor, the image and determining a parameter associated with a neck size of a driver of the vehicle that is present in the image;
- determining, with the processor, that the parameter associated with the neck size of the driver present in the image has increased more than a predetermined value; and
- modifying, with the processor, an operation of the vehicle based on the parameter associated with the neck size of the driver present in the image increasing more than the predetermined value.

15. The method of claim 14, wherein analyzing the image and determining the parameter associated with the neck size of the driver present in the image comprises:
- determining, with the processor, a set of synchronous face dimensions of the driver present in the image;
- identifying, with the processor, a neck of the driver present in the image;
- determining, with the processor, a dimension of the neck of the driver present in the image; and
- comparing, with the processor, the dimension of the neck to the set of synchronous face dimensions to determine a normalized dimension of the neck as the parameter associated with the neck size of the driver present in the image.

16. The method of claim 15, wherein identifying the neck of the driver present in the image comprises:
- segmenting, with the processor, the image to remove at least one of a seat color or a seat pattern from the image; and
- identifying, with the processor, the neck as a central, vertical body segment below a head of the driver present in the image.

17. The method of claim 15, wherein the normalized dimension of the neck is based on a ratio of the determined dimension of the neck to at least one facial dimension of the set of synchronous face dimensions.

18. The method of claim 14, wherein determining that the parameter associated with the neck size of the driver present in the image has increased more than a predetermined value comprises:
- determining, with the processor, that an amount of an increase in the parameter or a percentage increase in the parameter associated with the neck size of the driver present in the image has exceeded a threshold.

19. The method of claim 18, wherein the amount of the increase in the parameter or the percentage increase in the parameter is determined over at least one of a period of time, a number of trips of the vehicle, or a mileage driven by the driver.

20. The method of claim 14, wherein modifying the operation of the vehicle comprises:
- adjusting, with the processor, at least one of a warning margin or an assistance level for the driver when the parameter associated with the neck size of the driver present in the image has increased more than the predetermined value.

21. The method of claim 20, wherein adjusting the warning margin for the driver comprises:
- increasing, with the processor, at least one of an amount of time before a braking action, or a distance before initiation of the braking action, that the driver is alerted to the braking action.

22. The method of claim 21, wherein the amount of time before the braking action, or the distance before initiation of the braking action, that the driver is alerted to the braking action is based on an amount of increase of the parameter associated with the neck of the driver present in the image.

23. The method of claim 20, wherein adjusting the assistance level comprises:
 displaying or emitting, with the processor, an alert to the driver recommending that the driver take breaks more frequently.

24. The method of claim 20, wherein adjusting the assistance level comprises adjusting, with the processor, at least one of:
 braking performance of the vehicle;
 stability performance of the vehicle;
 a content of information of information that the system provides to the driver;
 a type of information that the system provides to the driver;
 an intensity of information that the system provides to the driver; or
 a frequency with which the system provides information to the driver.

25. The method of claim 14, wherein the imaging device is a driver facing camera.

* * * * *